Patented Nov. 3, 1942

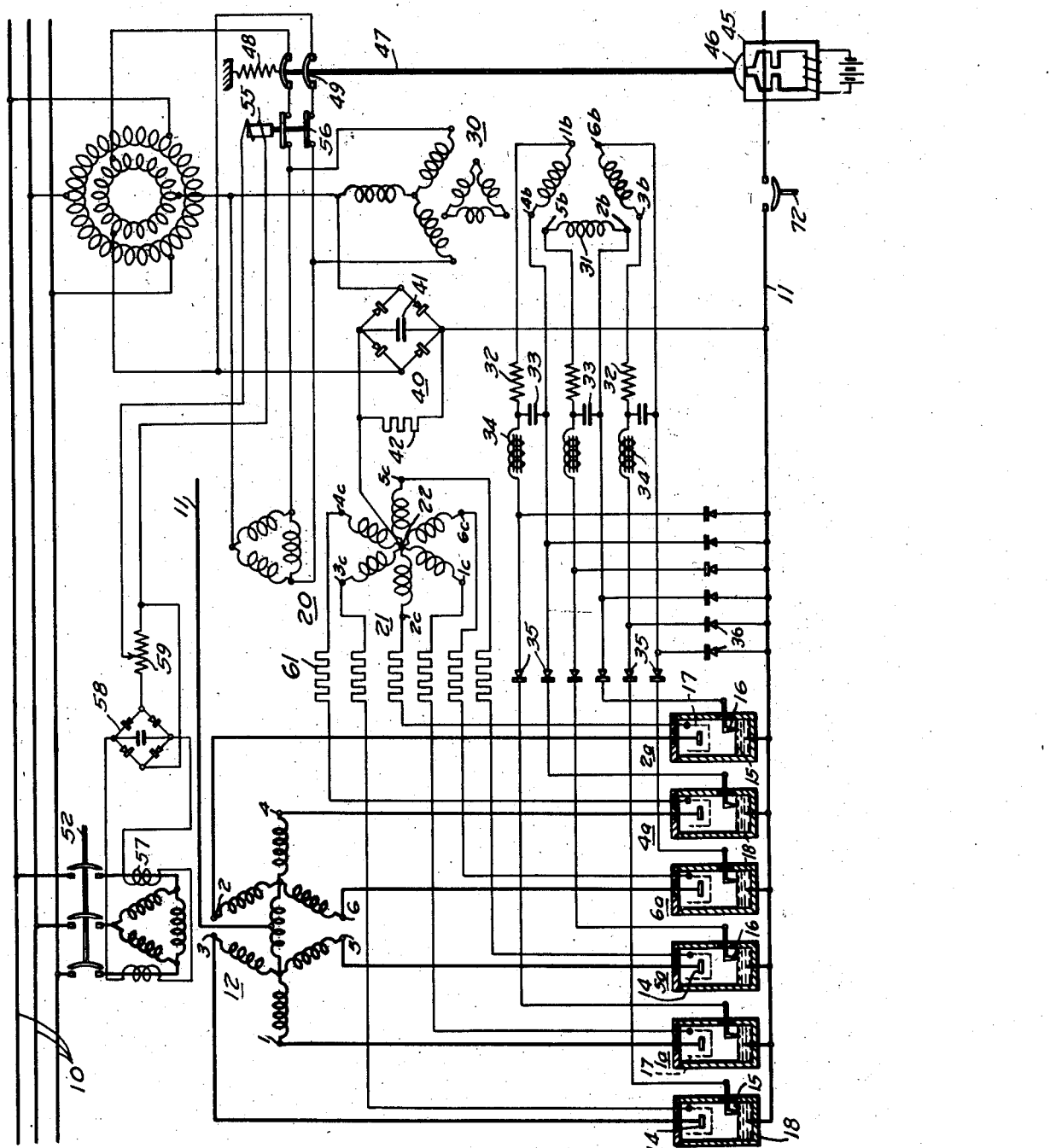

2,300,872

UNITED STATES PATENT OFFICE 2,300,872

ARC-BACK PROTECTIVE SYSTEM

Joseph H. Cox, Forest Hills, Pa., assignor to Westinghouse Electric & Manufacturing Company, East Pittsburgh, Pa., a corporation of Pennsylvania Application November 26, 1941, Serial No. 420,531

5 Claims. (Cl. 175—354)

My invention relates to an arc-back protective system and particularly to a control system for terminating arc-backs or short circuits in a vapor-electric converter of the make-alive type.

In the operation of valve-type vapor-electric devices, there is a random occurrence of lost commutation known in the art as an arcback. This phenomena is substantially identical with the phenomena known as flashover on commutator machines and, in general, the cure or method of terminating the condition is the same, namely, the disconnecting of the load and the interruption of the arc potential for a sufficient period to restore the commutating characteristic.

In the early development of make-alive type converters the arc was terminated or "snuffed" by merely discontinuing the application of the make-alive potential. The recent development of the ignitron converters has produced valves capable of carrying greatly increased currents and has resulted in the use of anode shields to assist in deionizing the space adjacent the anodes. In spite of this improved deionizing system, at these higher currents, valves will sometimes spontaneously ignite on the reaction to a fault or arcback in an associated valve even when the make-alive impulses have been interrupted. The faults may result in currents several times the normal load current so that the transformers and other connected equipment may be severely stressed. Also the protecting alternating current breakers must open under the high current, thus decreasing the satisfactory life of the breaker and introducing expensive maintenance.

It has been found that the valves not involved in an arcback or other fault may be more effectively blocked by applying a blocking or deionizing potential to the anode shield at the time of removing the make-alive impulses.

I have found that if the control measures can be taken quickly enough the build up of the fault current is not so great and both the magnitude and duration of stresses on the transformer and the switching equipment are materially reduced.

In the development of high speed control switching, it has been found that a "break" operation can be made much quicker and much more satisfactorily than a "make" operation.

According to my invention a simple high speed relay having only "break" contacts is utilized to interrupt the normal excitation impulses and positively apply blocking potential to limit the fault current in a make-alive type converter.

It is an object of my invention to provide a simple high speed system to block a converter in response to a fault.

It is a further object of my invention to apply a high speed relay using only break contacts to block operation of a converter.

It is a further object of my invention to provide a blocking system to remove a fault in one section of a sectionalized ignitron rectifier without the opening of the supply circuit breaker and permit the sound sections to be returned to service with a much shorter outage than would be possible with main circuit breaker operations.

It is an object of my invention to provide a control system in which the arcs in all of the valves of the converter will be extinguished in response to a predetermined condition of the direct current circuit of the converter.

It is a further object of my invention to provide a system which will terminate the arcback at high speed to prevent injury to the component parts of the converter system.

It is a further object of my invention to provide a control system in which the necessary biasing potential is positively applied on the occurrence of an arcback or short circuit.

Other objects and advantages of my invention will be apparent from the following detailed description taken in conjunction with the accompanying drawing, in which the single figure is a schematic illustration of a make-alive type converted according to my invention.

In the exemplary embodiment of my invention, an alternating current circuit "and a direct current circuit" are interconnected by means of a rectifier transformer 12 herein illustrated as of the double three-phase type having phase terminals 1 to 6 and the flow of current between the circuit 10 and 11 is controlled by means of a plurality of make-alive type valves 1a to 6a each of the valves including an anode 14, a cathode 15, a make-alive electrode 16 in contact with the cathode 15 and an anode shield 17 about the anode 14, all being enclosed within a suitable vacuum proof container 18.

The control system for the vapor-electric valves comprises an impulse generator for supplying periodic impulses to the respective make-alive electrodes 16 and a biasing system for impressing control potentials upon the respective anode shields 17. In order to secure positive application of a negative biasing potential in the event of an arcback, I have provided a biasing system comprising a constantly energized source of direct current potential connected in series with an alternating current potential, preferably provided by means of a transformer 20 having a star-connected secondary winding 21 with the direct current potential connected between the star point 22 of the winding 21 and the cathodes 15 of the vapor-electric valves 1a to 6a.

A high speed reverse current relay is associated with the direct current circuit and operates a switching device controlling the energization of the impulse generator and the alternating current biasing source from any suitable source of alternating current having the same frequency as the frequency of the potential applied to the vapor-electric valves.

While any available impulsing generator may be utilized, I prefer to use a peaking generator of the so-called wave distorter or saturated reactor type. This peaking generator comprises a transformer 30 having a plurality of substantially independent secondary phase windings 31, the opposite terminals 1b to 6b of these phase windings 31 being connected to the make-alive electrodes 16 of diametrically operating electric valves 1a to 6a, the wave-shape applied to the electrode being determined by a wave distorting circuit comprising a series impedance 32, a shunt-connected capacitor 33 and a saturating reactor 34 which produces an alternating current potential having oppositely directed peaks of relatively short duration.

Asymmetric conductors, such as copper-oxide rectifiers 35 are connected in series with each of the make-alive electrodes so that the output wave of the wave distorter circuit is selectively applied to the make-alive electrodes 16. The return circuit connection is made through an asymmetric conductor 36 in shunt with the make-alive electrode 16 and series rectifier 35 of the opposite valve of the pair.

While any suitable source of direct current biasing potential may be utilized, I prefer to use a full-wave rectifier 40 energized from the source of control potential and having a capacitor 41 connected across the output terminals to stabilize the direct current output potential. This output potential may be further stabilized by means of a resistor 42 across the output terminals of the full-wave rectifier 40. The output potential of the full-wave rectifier 40 is then impressed between the cathodes 15 of the make-alike type valves and the neutral connection 22 in the secondary winding 21 of the alternating-current biasing transformer 20.

To control the application of the biasing transformer 20 and the impulse generator, I have provided a high-speed relay 45 of the so-called bucking-bar type associated with the direct current circuit 11 and operating a contactor mechanism controlling the connection of the impulse generator and the biasing transformer 20 to any suitable source of alternating current supply. In the event of arcback in the converter, the high-speed relay 45 will release the armature 46 of the contact operating device 47 and the spring 48 will open the contacts 49 at high speed. In actual practice, a bucking-bar relay of this type will open its contacts in a very small fraction of a second. In this manner, the make-alive impulses are removed from the non-faulty valves before they have a chance to pick up after the appearance of the arcback. At the same time, the alternating current biasing potential will be removed from the anode shields 17 and the direct current biasing potential will remain effective to prevent self-pick up of any non-faulty valve. At the same time, the high speed direct current relay 72, preferably of the bucking-bar type, will open to remove the direct current from any valve undergoing arcback so that the arcback will be extinguished.

In the event of short circuit I utilize a high speed over current breaker 55 having its contacts 56 in series with the contacts 49 of the bucking-bar relay 45. The reverse current relay 55 is energized from a current transformer 57 in the alternating current leads to the converter. I prefer to rectify the output of the current transformer 57 by means of a full wave rectifier 58 having a load impedance 59 connected across its terminals. The operating coil of the relay 55 is adjustably connected across the load impedances for selectively impressing an operating potential on the coil.

In practice, I have found that certain values or relations of potentials are desirable for securing reliable operation of the control system. Using a wave distorting circuit of the type disclosed in application, Serial No. 404,888, filed July 31, 1941, by Pakala and Myers and having circuit constants found suitable in commercial practice, the potentials of the phase terminals 1b to 6b of the impulsing transformer 30 should be approximately 150° ahead of the potentials applied to the main anodes 14 of the valves 1a to 6a. Also, the potentials of the phase terminals 1c to 6c of the alternating current biasing source 30 should be approximately from 30 to 90° ahead of the potentials applied to the main valves 1a to 6a so that the make-alive impulse and the application of control potential to the anode shield 17 occurs at the proper time to facilitate commutation between the successively operating valves. I have found that the potential of the direct current biasing source and the potential of the alternating current biasing source should be so proportioned that the alternating current biasing potential will cancel out or overcome the direct current biasing potential for approximately 60 electrical degrees in each positive half cycle of the main anode. Also, it is desirable to so proportion the resistance characteristics of the biasing circuit that in the event of an arcback, a substantially constant direct current biasing potential will be applied to the anode shields 17. In actual practice, I have found that a direct current potential of approximately 200 volts direct current being stabilized by a 200 ohm resistor and 1000 microfarad capacitor, will produce a proper terminal potential when impressed on a transformer having 220 volts R. M. S. to neutral. Also I have found it desirable to use current limiting resistors 61 with approximately 1000 ohms in each of the biasing leads to control the flow of current which might otherwise disturb the terminal potential of the biasing source.

In the operation of the system according to the invention a reversal of current in the line 11 associated with relay 45 will produce a flux in the core which neutralizes the flux normally passing through armature 46 so that it is not held sufficiently to offset the pull of spring 48 which then opens the contacts 49. The mass of the parts 46, 47 and 49 is made as small as practical to reduce the inertia and therefore speed up the action. In the event relay 45 does not function or in the event of a short circuit or other fault producing abnormal high current the current transformer 57 will energize high speed relay 55 and open contacts 56. The opening of either contacts 49 or 56 will deenergize transformers 20 and 30, thus removing the alternating current bias from the shields leaving the negative direct current bias effective to prevent pickup of any non-current carrying anode, at the same time the impulses to the make-alive electrode are terminated, thus effectively snuffing out the fault arc and as soon as the ionization has been dissipated the converter may be returned to service.

While for purposes of illustration, I have shown and described a specific embodiment of my invention, it will be apparent that changes and modifications can be made therein without departing from the true spirit of my invention or the scope of the appended claims.

I claim as my invention:

1. An electric current translating system comprising a polyphase circuit, a direct current circuit, transformer means interconnecting said circuits, a plurality of electric valves of the make-alive type for determining current flow between said circuits, each of said valves including an anode, a cathode, an anode shield, a control system for said valves including a source of polyphase control energy, a first transformer energized from said source, wave distorter means for applying the output potential of said first transformer to the make-alive electrodes, a second transformer energized from said source, means for impressing the output potentials of said second transformer on said anode shields, a source of direct current potential, means for connecting the direct current potential between said second transformer and the cathodes of the valves and a high speed reverse current relay for disconnecting said first and second transformers from the source of control potential.

2. An electric current translating system comprising in combination an electric valve converter for controlling the flow of current between two electrical circuits, at least one of which is a direct current circuit, each valve of said converter including an anode, a cathode, a make-alive electrode and an anode shield, a control system including a generator of sharply peaked control impulses, means for selectively impressing said impulses on the make-alive electrodes, a biasing transformer, a source of direct current biasing potential, connections for impressing the potential of said direct current source and said biasing potential in series between the cathode of said valves and said anode shields, a source of alternating control potential, connections for energizing said generator and said biasing transformer from said source, a reverse current relay associated with said direct current circuit, means actuated by said relay for opening the connections between said source and said generator and biasing transformer.

3. A vapor-electric conversion system for transferring energy between a polyphase alternating current circuit and a direct current circuit comprising a plurality of make-alive type valves for controlling the flow of energy between the circuits, each of said valves including a cathode, an anode, a make-alive electrode and an anode shield enclosed in a vacuum chamber, a source of polyphase control potential having a frequency corresponding to that of the polyphase circuit, a control transformer energized from said source, wave distorter means for impressing the output of said control transformer on the respective make-alive electrodes, a second transformer energized from said source, means for impressing the output potential of said second transformer on said anode shields, a source of direct current biasing potential, means for connecting said biasing potential in series with said second transformer and high speed circuit breaker means tripped by reverse current in said direct current circuit for disconnecting said control transformer and said second transformer from said source.

4. In an electric current translating system having a plurality of make-alive type valves, control system comprising a make-alive electrode in each of said valves, an anode-shield in each of said valves, a source of polyphase control energy, a first control transformer, wave distorter means for impressing the potential of said first control transformer on said make-alive electrodes, a second control transformer, means for impressing the output potential of said second transformer on said anode shields, a neutral connection in said second transformer, a source of direct current potential, means for connecting said source of direct current between the cathodes of said valves and the neutral connection of said second transformer and means including a high speed reverse current relay for connecting said control transformers to said source of control energy.

5. In an electric current conversion system including a plurality of make-alive type electric valves, a control system comprising a make-alive electrode in each of said valves, an anode shield in each of said valves, a source of polyphase control potential, a wave distorter system energised from said source for periodically and successively energizing said make-alive electrodes, a source of direct current potential, means for impressing said direct current potential on the anode shields, transformer means energized from said source of control potential, means for impressing the potential of said transformer means on said anode shields and high speed relay means responsive to fault conditions in said conversion system to de-energize said transformer means and said wave distorter system.

JOSEPH H. COX.